United States Patent

Sako et al.

[11] Patent Number: 5,897,189
[45] Date of Patent: Apr. 27, 1999

[54] METHOD OF MANUFACTURING LIQUID CRYSTAL DISPLAY ELEMENT

[75] Inventors: Teiyu Sako, Kashiwa; Nobuyuki Itoh, Noda; Mitsuhiro Koden, Kashiwa, all of Japan; John Clifford Jones, Malvern, United Kingdom

[73] Assignees: Sharp Kabushiki Kaisha, Osaka, Japan; The Secretary of State for Defence in Her Britannic Majesty's Government of the United Kingdom of Great Britain and Northern Ireland, Hants, United Kingdom

[21] Appl. No.: 08/821,477

[22] Filed: Mar. 21, 1997

[30] Foreign Application Priority Data

May 17, 1996 [JP] Japan .................................. 8-123283

[51] Int. Cl.⁶ ........................................................ G02F 1/13
[52] U.S. Cl. ............................ 349/171; 349/172; 349/174
[58] Field of Search ..................................... 349/171, 172, 349/174

[56] References Cited

U.S. PATENT DOCUMENTS

| | | | |
|---|---|---|---|
| 5,013,137 | 5/1991 | Tsuboyama et al. | 349/172 |
| 5,164,852 | 11/1992 | Konuma | 279/172 |
| 5,214,523 | 5/1993 | Nito et al. | 349/173 |
| 5,465,169 | 11/1995 | Eguchi | 349/171 |
| 5,495,352 | 2/1996 | Shinjo et al. | 349/143 |
| 5,504,600 | 4/1996 | Pirs et al. | 349/171 |
| 5,543,943 | 8/1996 | Hanyu et al. | 349/171 |
| 5,552,916 | 9/1996 | O'Callaghan et al. | 349/171 |

FOREIGN PATENT DOCUMENTS 0553727 8/1993 European Pat. Off. .
62-250419 10/1987 Japan .
4-78969 12/1992 Japan .

OTHER PUBLICATIONS

"High Resolution, Large Area FLC Display with High Graphic Performance"; by Joniehiro Kanbe et al.; Ferroelectrics 1991, vol. 114, pp. 3–26.

Search Report for Application No. GB 9706534.6; Dated Jun. 23, 1997.

J. Pavel et al.; Liquid Crystals, 1991., vol. 9, No. 1, pp. 87–93, "A New Type of Layer Structure Defects in Chiral Smectics".

Y. Sato et al., Japanese Journal of Applied Physics, vol. 28, No. 3, Mar. 1989, pp. L 483–L 486, "High Quality Ferroelectric Liquid Crystal Display with Quasi–Bookshelf Layer Structure."

S. Garoff et al., Physical Review Letters, vol. 38, No. 15, Apr. 11, 1997, pp. 848–851, "Electroclinic Effect at the A–C Phase Change in a Chiral Smectic Liquid Crystal."

*Primary Examiner*—William L. Sikes
*Assistant Examiner*—Toan Ton

[57] ABSTRACT

A manufacturing method includes a process of once heating a liquid crystal material to a temperature at which an isotropic phase appears therein and then cooling the liquid crystal material, the liquid crystal material being a ferroelectric liquid crystal or antiferroelectric liquid crystal, to be performed under an applied AC electric field which generates an electroclinic effect in a temperature range of from a temperature 20° C. above a phase transition temperature at which a transition in phase occurs from a smectic A phase to a chiral smectic C phase to a temperature 20° C. below the phase transition temperature.

11 Claims, 8 Drawing Sheets

METHOD OF MANUFACTURING LIQUID CRYSTAL DISPLAY ELEMENT

FIELD OF THE INVENTION

The present invention refers to a method of manufacturing a liquid crystal display element using a ferroelectric liquid crystal or an antiferroelectric liquid crystal.

BACKGROUND OF THE INVENTION

Conventional liquid crystal display elements include, for example, a TN (Twisted Nematic) liquid crystal display element and an STN (Super-Twisted Nematic) liquid crystal display element which use nematic liquid crystals. However, such liquid crystal display elements suffer a drawback of long response time (ms order) to an electro-optic effect when driven at high speed, which causes a disorder in the screen, low contrast, etc., thereby imposing limits on display capacity. To overcome such problems, a liquid crystal display element using a ferroelectric or antiferroelectric liquid crystal has been expected to enter the market for practical applications as the next liquid crystal display forward.

Such ferroelectricity in the liquid crystal is first confirmed by R. B. Meyer, et al., in 1975 by synthesizing a DOBAMBC (2-methylbutyl p-[p-(decyloxybenzylidene)-amino] -cinnamate) as a result of research based on the assumption that from the symmetric property of molecules, if an optically-active molecule has a dipole moment in a direction perpendicular to a major axis of the molecule, ferroelectricity would appear in a chiral smectic C phase (SmC* phase) (see R. B. Meyer, L. Liebert, L. Strzelecki and P. Keller:J. Phys. (Paris) 36 (1975) L69).

Figure 6A:
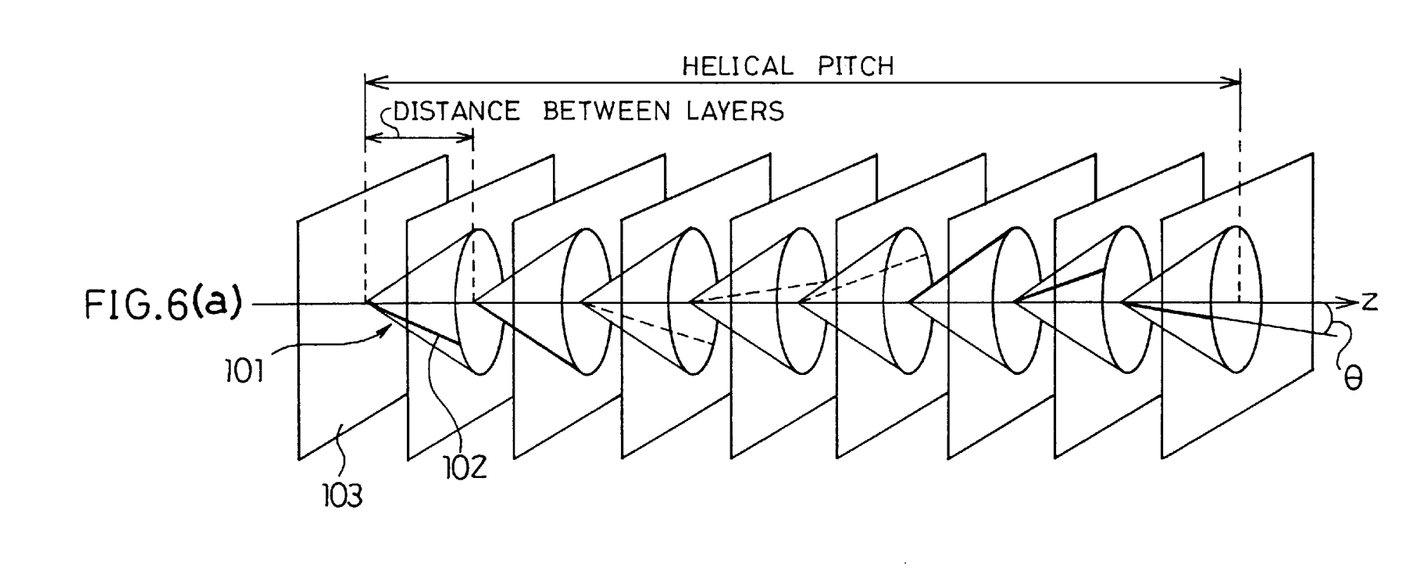
FIG. 6(a) is a typical depiction showing an alignment of the liquid crystal molecule in the SmC* phase having ferroelectricity.

Here, the structure of the SmC* phase having the ferroelectricity will be explained. In the SmC* phase, the center of gravity of the liquid crystal molecule in the layer is in disorder. However, as shown as cones 101 in a typical depiction of FIG. 6(a), a major axis of the liquid crystal molecule (director 102) is tilted by a prescribed angle θ with respect to a layer normal line z (normal line of a layer 103 dividing the smectic layer). The director 102 rotates so as to have a slightly different angle from layer to layer, and thus the liquid crystal molecules have an alignment of a helical structure. In this helical structure, a helical pitch is around 1 μm which is significantly longer than a clearance between layers (around 1 nm). The phase having the described molecular alignment is confirmed not only in the ferroelectric liquid crystal but also in the antiferroelectric liquid crystal (see A. D. L. Chandani, T. Hagiwara, Y. Suzuki, Y. Ouchi, H. Takezoe and A. Fukuda: Jpn. J. Appl. Phys. 27(1988)L729.).

Figure 6B:
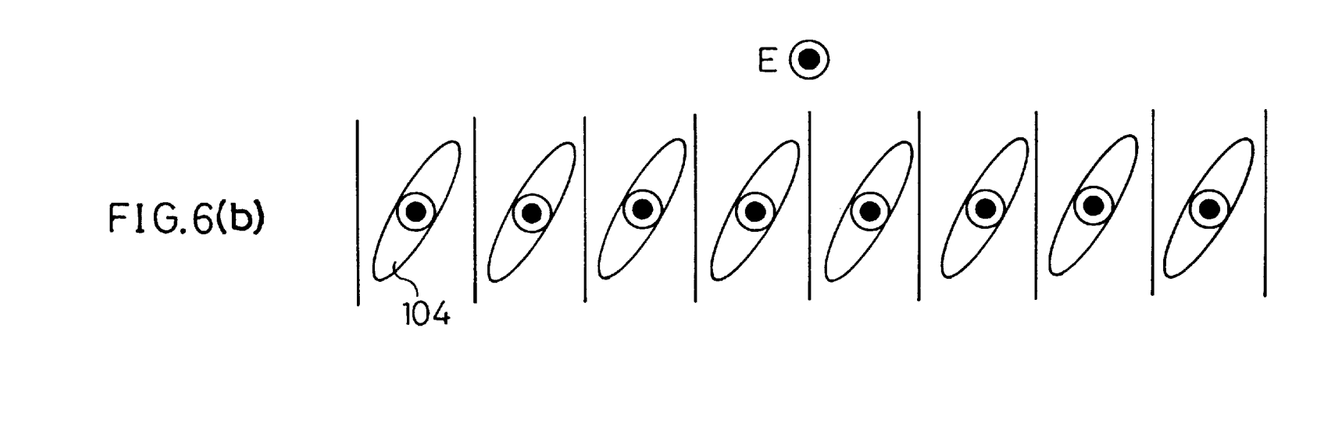
FIG. 6(b) is a typical depiction showing the molecular alignment having applied thereto the electric field in a direction perpendicular to a sheet surface from a back surface side to a front surface side in the state where the helical structure of a liquid molecular is released in a thinner cell than the helical pitch, while showing a direction of a dipole moment of each liquid crystal molecule.
Figure 7:
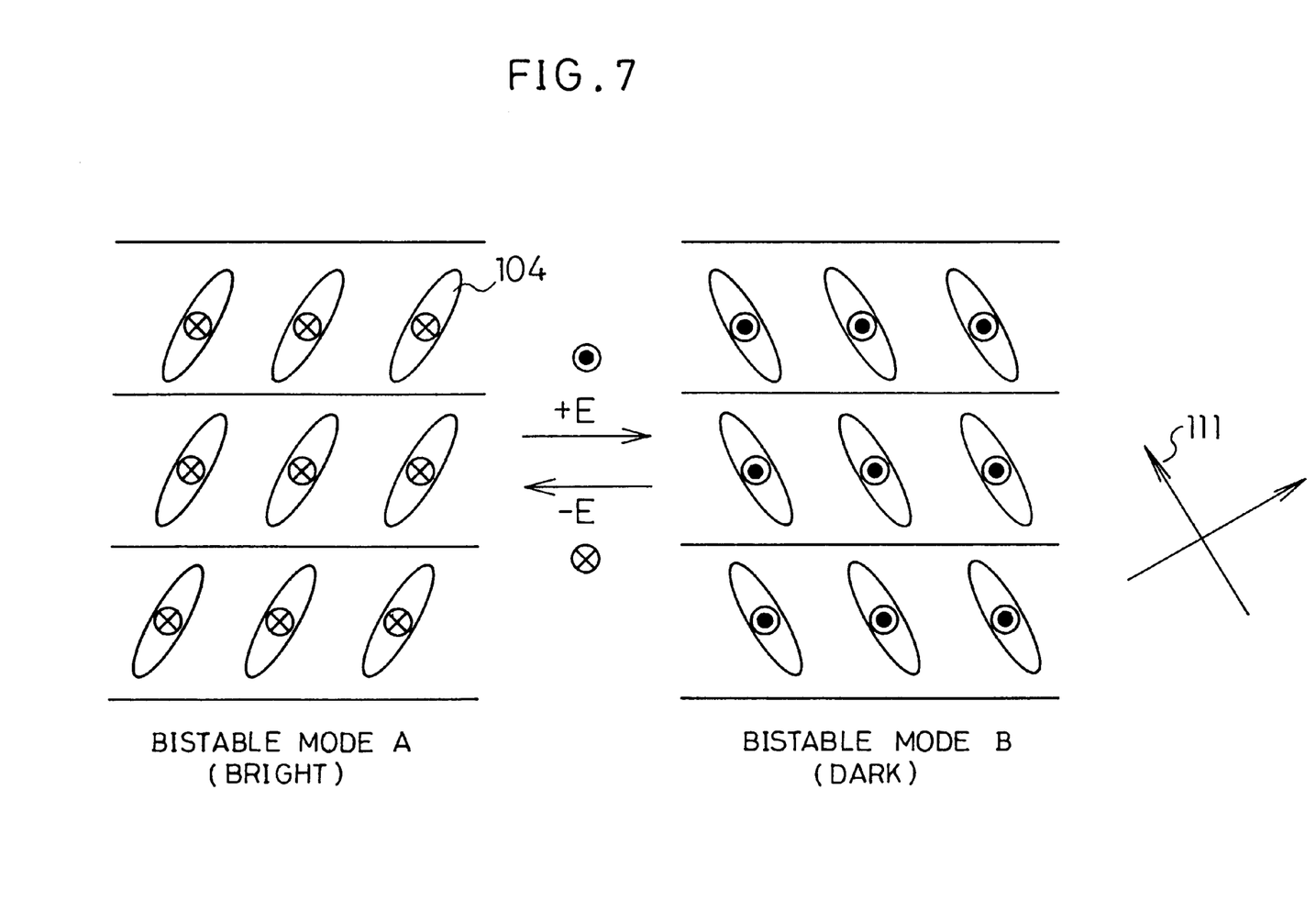
FIG. 7 is a typical depiction showing a principle of the operation of a surface stabilized ferroelectric liquid crystal display element.

Clark and Lagerwall discovered that such helical structure disappears when the cell thickness is less than around 1 μm (approximately the same as the helical pitch), and as shown in FIG. 6(b), the molecule 104 in each layer is in either one of the bistable modes according to an applied electric field, and they proposed "the surface stabilized ferroelectric liquid crystal (SSFLC)" which is disclosed by Japanese Laid-Open Patent Application No. 107216/1981 (Tokukaisho 56-107216) and U.S. Pat. No. 4,367,924. In FIG. 6(b), the electric field applied to the molecule 104 has a direction perpendicular to the sheet surface of the figure from the back surface side to the front surface side. An electric dipole moment of the molecule 104 is completely arranged in a direction of the applied electric field as shown in each molecule in FIG. 6(b). The above-mentioned mechanism will be explained in reference to FIG. 7. As described, the molecule 104 of the SSFLC formed as a thin cell is in either a bistable mode A or a bistable mode B according to the direction of the applied electric field as shown in FIG. 7. In the bistable mode A shown in FIG. 7, the electric field applied to the molecule 104 has a direction perpendicular to the sheet surface in the figure from the front surface side to the back surface side. While, in the bistable mode B, the electric field has a direction perpendicular to the sheet surface from the back surface side to the front surface side.

Therefore, by forming a SSFLC cell between two polarizers whose polarization axes cross at right angle, for example, in such a manner that the major axis of the molecule lies parallel to the direction of one polarizer in the bistable mode B (direction 111 shown by an arrow in the figure), a bright state appears in the bistable mode A by allowing a transmission of light, while a dark state appears in the bistable mode B by shutting off a transmission of light. Namely, by switching the direction of the applied electric field, a black-and-white display can be achieved. Here, an apparent angle formed by an optical axis in the state where the molecule is in one bistable mode (for example, the bistable mode A) and an optical axis in the state where the molecule is in the other bistable mode (for example, the bistable mode B) is referred to as "memory angle".

In the SSFLC, since a spontaneous polarization and the electric field interact directly, different from the general switching using the dielectric anisotropy in the nematic crystal, a short response time of not more than millisecond (ms) order can be achieved with respect to the electric field. Besides, the SSFLC offers a beneficial feature of memory function that once the bistable mode is achieved, the bistable mode can be maintained even with a removed electric field, thereby eliminating the necessity of applying a voltage constantly.

As described, in the SSFLC, by utilizing its advantageous characteristic of short response time and memory function, the display signal can be written per each scanning line at high speed, thereby permitting a display of a large capacity with the simple matrix drive system. For the described beneficial characteristics, the application of the SSFLC to a hung-wall type television is also expected.

Figure 8A:
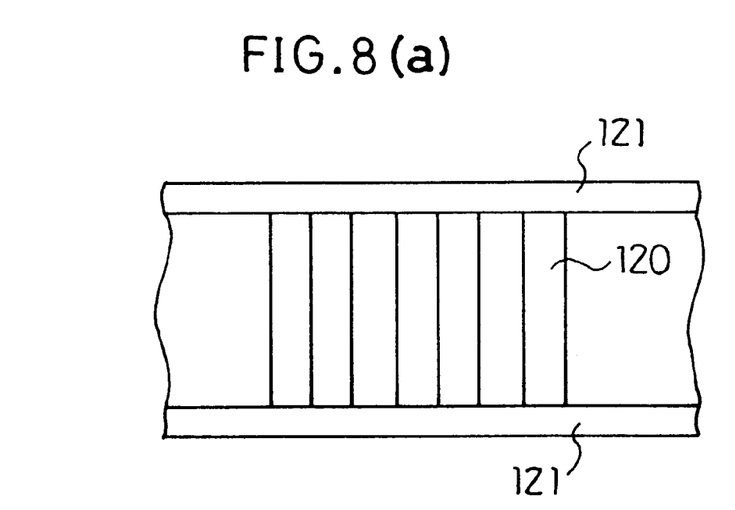
FIG. 8(a) is a typical depiction showing a bookshelf structure in a SmC* phase.
Figure 8B:
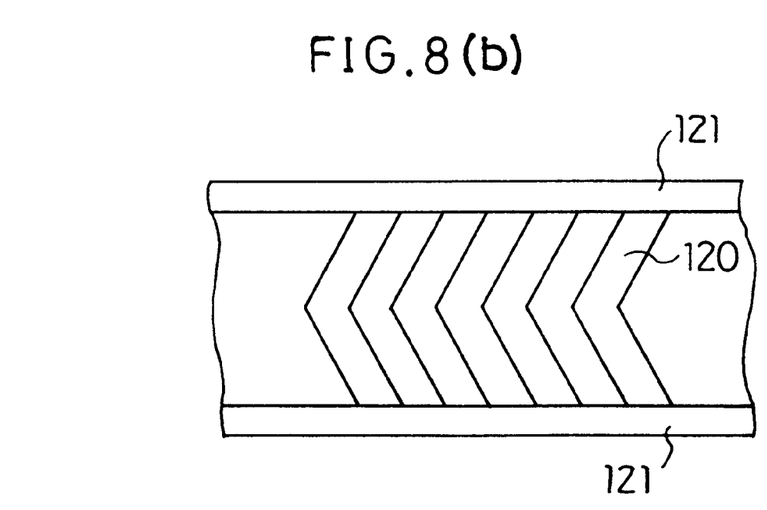
FIG. 8(b) is a typical depiction showing a chevron structure in a SmC* phase.

The liquid crystal molecule in the described SSFLC preferably has a uniform alignment of the bookshelf structure wherein a liquid crystal layer 120 is formed perpendicularly to a glass substrate 121 as shown in FIG. 8(a). In practice, however, the liquid crystal molecule has an alignment of the chevron structure wherein a liquid crystal layer 120 is bent to the normal line of a glass substrate 121 in chevron as shown in FIG. 8(b). The liquid crystal molecule having an alignment of the chevron structure has drawbacks in that an memory angle is reduced which causes the amount of transmitted light to be reduced, or an alignment defect, called "zigzag defect" occurs between the layers which are bent in the opposite direction, resulting in low contrast.

As a solution to such problems, a method of approximating the structure of the liquid crystal layer to the quasi-bookshelf structure while applying an electric field in the SmC* phase has been proposed, for example, by Y. Sato (see "Japanese Journal of Applied Physics" Vol. 28, No. 3, March, 1989, pp.L483–L486). This method is effective in increasing the memory angle, yet has such drawbacks that the irregularity in texture tends to occur due to many line defects, or the response time to the drive electric field increases, etc. Therefore, the described method, in fact, does not provide an effective solution to the described problem.

SUMMARY OF THE INVENTION

An object of the present invention is therefore to provide a method of manufacturing a liquid crystal element, which permits an increase in memory angle by approximating the structure of the liquid crystal layer to a desirable bookshelf structure, which offers a bright and high contrast liquid crystal display element.

The described object is accomplished by the method of manufacturing a liquid crystal display element in accordance with the present invention, the liquid crystal display element including a liquid crystal material sealed between a pair of substrates, wherein a phase-transition to a prescribed phase in the liquid crystal material is permitted by heating and subsequently slow cooling the liquid crystal material. The method is characterized in that the liquid crystal material is one member selected from the group consisting of a ferroelectric liquid crystal material and an antiferroelectric liquid crystal material, and that in a transition process from a smectic A phase (SmA phase) to a chiral smectic C phase (SmC* phase), the liquid crystal material is cooled slowly under an applied AC electric field which generates an electroclinic effect.

According to the described manufacturing method, in the process of slow cooling the heat-treated liquid crystal material having ferroelectricity or antiferroelectricity to a predetermined temperature, in the phase transition from the smectic A phase to the chiral smectic C phase, in which the chevron structure appears, by applying an AC electric field which generates the electroclinic effect, a tilt angle of the chevron structure can be reduced without damaging the drive properties (low voltage driving and short response time) of the ferroelectric or antiferroelectric liquid crystal. Here, the tilt angle suggests the tilt angle of the layer surface with respect to the normal line of the substrate, and the smaller the tilt angle is, the more approximate to the quasi-bookshelf structure is the layer structure, and the larger is the memory angle.

Figure 5:
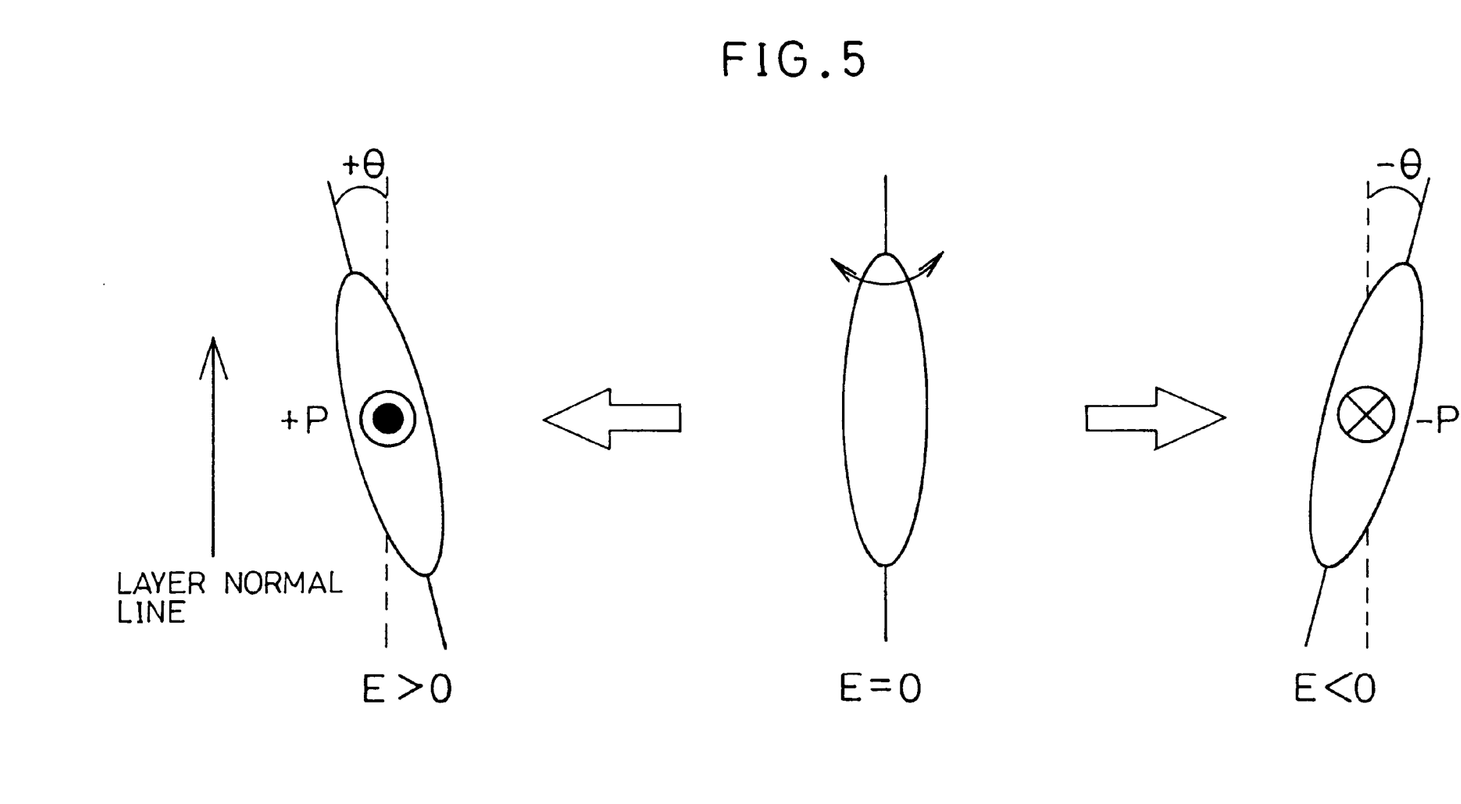
FIG. 5 is a typical depiction showing the electroclinic effect wherein the major axis of the liquid crystal molecule is tilted from the normal line of the layer while applying the AC electric field.

The described electroclinic effect will be explained in reference to FIG. 5.

The electroclinic effect discovered by the Garoff and Meyer suggests phenomenon wherein in the SmA phase of the liquid crystal constituted by the chiral molecules, when the electric field parallel to the layer surface is applied, the major axis of the liquid crystal molecule is tilted with respect to the layer normal line direction (see S. Garoff and R. B. Meyer: Phys. Rev. Lett. 38 (1977) p. 848). The electroclinic effect is clearly observed as the pre-transitional phenomenon in a vicinity of the phase transition temperature from the SmA phase to the SmC* phase. It is known that the generation of the ferroelectricity in the SmC* phase is closely related to the electroclinic effect.

The mechanism of generating the electroclinic effect can be explained based on the symmetric property of the molecule. Without an applied electric field (E=0 in FIG. 5), the molecule in the SmA phase has its major axis aligned in the direction of the normal line of the layer shown by an arrow in the figure so as to be freely rotatable about the axis. Therefore, the uniaxis in the direction of the normal line of the layer exists as the symmetry axis.

However, with an applied electric field in a direction parallel to the layer, the electric dipole moment perpendicular to the major axis of the molecule is aligned in the direction of the electric field, and free rotation about the major axis of the molecule is restricted. In FIG. 5, the electric field is applied in the direction of the normal line with respect to the sheet surface of the figure. For convenience, the direction from the back surface side to the front surface side of the sheet is designated as a positive direction (+E), and the direction from the front surface side to the back surface side is designated as the negative direction (−E). When the electric field is applied, the normal line of the layer would be no longer the symmetry axis, and a macroscopic polarization P appears parallel to the layer. Here, the electric field induced tilt angle $\theta$ is linearly connected to the polarization P (piezoelectric effect). With an application of the electric field +E, the major axis of the molecule rotates by +$\theta$ (soft mode) about an axis in the electric field direction. On the other hand, with an applied electric field having the negative direction (−E), the rotating direction of the major axis of the molecule also inverses to rotate by −$\theta$. Namely, with an application of an AC electric field, the polarity of the electric field E inverses alternatively, and the liquid crystal molecule switches to be tilted by ±$\theta$ symmetrically about the symmetry axis of the layer normal line in the plane having the normal line in the direction of the electric field.

The electroclinic effect permits the layer tilt angle to be reduced with respect to the normal line of the substrate for the following mechanism. Without an applied AC electric field, in the transition process from the S rmA phase to the SmC* phase, as the liquid crystal molecule is tilted from the normal line of the layer, an interval between the layers would be made narrower, and the chevron structure appears wherein the layer is tilted with respect to the normal line of the substrate. Here, upon generating the electroclinic effect with an applied AC electric field, and reducing the temperature while switching the molecule, a phase transition occurs while spontaneously showing the state where the major axis of the molecule instantaneously has a direction of the normal line of the layer. As a result, a reduction of an interval between the layers is suppressed, thereby reducing the layer tilt angle.

Additionally, it is confirmed by observation that the electroclinic effect increases in a vicinity of the phase transition temperature from the SmA phase to the SmC* phase. In the manufacturing method defined in the present invention, an AC electric field is applied in a temperature range where the electroclinic effect is obvious, thereby permitting the layer structure to approximate to the ideal bookshelf structure. Additionally, as the described temperature range corresponds to the initial state in which the chevron structure is shown, the layer tilt angle is small, and the layer can be maintained in a direction perpendicular to the substrate with relatively small electric field energy. Additionally, by the treatment with the electric field, a uniformly aligned state of the liquid crystal molecule (C1U alignment or C2U alignment) can be achieved to obtain a uniform texture.

According to the described manufacturing method, the layer tilt angle is reduced, and a larger memory angle can be achieved, thereby permitting a bright and high contrast liquid crystal display element.

It is preferable that the described method be arranged such that the following conditions are satisfied:

$$T_c \leq T_B \leq T_c + 20$$

and $$T_c - 20 \leq T_E \leq T_c,$$

wherein $T_B$ [° C.] is a temperature of the liquid crystal material at a start of an application of the AC electric field, $T_E$ [° C.] is a temperature of the liquid crystal material when the application of the AC electric field is completed, and $T_c$ is a transition temperature of the liquid crystal material from a smectic A phase to a chiral smectic C phase, and that the AC electric field has a frequency in a range of from 1 Hz to 10 K Hz, and an amplitude in a range of from 0.5 V/μm to 30 V/μm.

In the ferroelectric liquid crystal and the antiferroelectric liquid crystal, the electroclinic effect obviously appears in a temperature range of from a temperature 20° C. above the transition temperature $T_c$ [° C.] at which a transition in phase occurs from the smectic A phase to the chiral smectic C phase and a temperature 20° C. below the transition temperature $T_c$ [° C.]. Therefore, while applying the AC electric field having a frequency in a range of 1 Hz and 10 kHz, and an amplitude in a range of 0.5 V/μm–30 V/μm within the described temperature range, the electroclinic effect as the pre-transitional phenomenon from the smectic A phase to the chiral smectic C phase can be used effectively to reduce the tilt angle of the layer with respect to the normal line of the substrate. Since this permits the structure of the liquid crystal layer to approximate to the bookshelf structure, a bright and high contrast liquid crystal display element can be achieved.

The novel features which are considered as characteristic of the invention are set forth in particular in the appended claims. The improved treatment method, as well as the construction and mode of operation of the improved treatment apparatus, will, however, be best understood upon perusal of the following detailed description of certain specific embodiments when read in conjunction with the accompanying drawings.

DESCRIPTION OF THE EMBODIMENTS

The following descriptions will explain one embodiment of the present invention in reference to FIG. 1 through FIG. 4. The explanations will be given through a liquid crystal panel adopting a ferroelectric liquid crystal material having a negative dielectric anisotropy as the liquid crystal material. The structure and the manufacturing method of the liquid crystal panel are as explained below.

Figure 2:
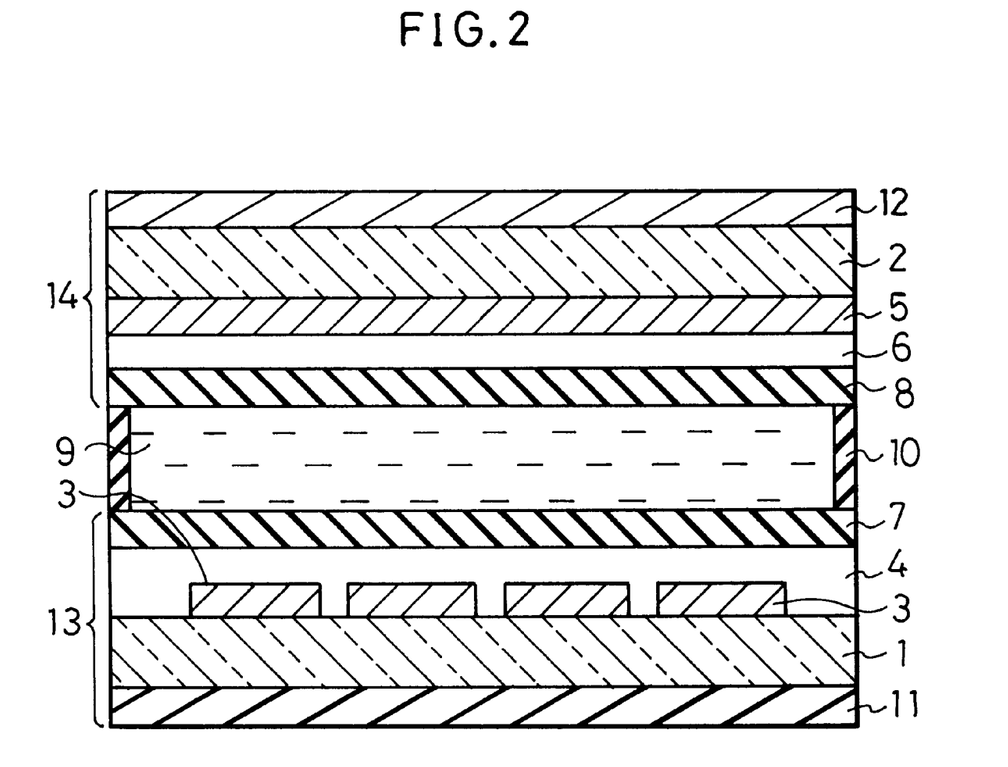
FIG. 2 is a cross-sectional view showing a schematic structure of the liquid crystal panel.

As illustrated in FIG. 2, the liquid crystal panel in accordance with the present embodiment includes a pair of glass substrates 1 and 2 formed so as to oppose one another. Between the pair of glass substrates 1 and 2, formed in a stripe manner respectively are transparent signal electrodes 3 and scanning electrodes 5 respectively on inner surfaces of the glass substrates 1 and 2, transparent insulating films 4 and 6, alignment films 7 and 8 and a liquid crystal 9.

On the outside surface of the glass substrate 1, formed is a polarization plate 11. The polarization plate 11, the glass substrate 1, the signal electrodes 3, the insulating film 4 and the alignment film 7 constitute an electrode substrate 13. Similarly, the polarization plate 12, the glass substrate 2, the scanning electrodes 5, the insulating film 6 and the alignment film 8 constitute an electrode substrate 14. In a space formed between the electrode substrates 13 and 14, a liquid crystal 9 is injected and is sealed by a sealing agent 10.

The polarization plates 11 and 12 are arranged such that polarization axes thereof cross at right angle. Additionally, a space formed between the electrode substrates 13 and 14 is maintained constant by spacers (not shown).

Figure 1:
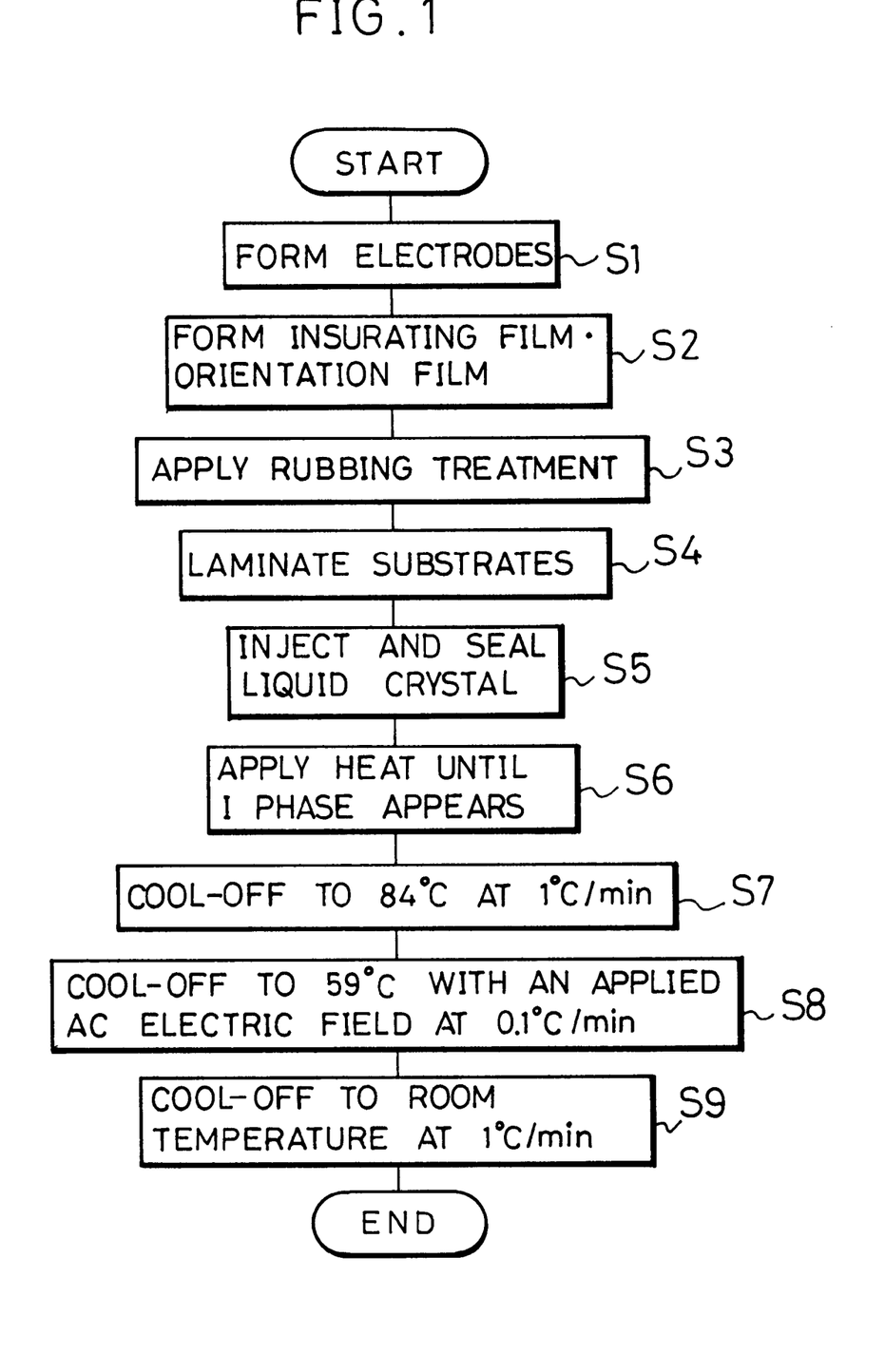
FIG. 1 is a flowchart showing an essential process of the manufacturing method of the liquid crystal panel in accordance with one embodiment of the present invention.

The manufacturing process of the liquid crystal panel will be explained in reference to the flowchart of FIG. 1.

First, with respective surfaces of the glass substrates 1 and 2, signal electrodes 3 and scanning electrodes 5 are formed in a stripe manner respectively with a thickness of 100 nm using indium tin oxide (ITO) (first step, hereinafter designated as S1), and further the insulating films 4 and 6 made of $SiO_2$ are formed thereon with a thickness of 120 nm, and alignment films 7 and 8 made of polyimide are formed with a thickness of 50 nm (S2). Thereafter, a rubbing treatment is applied to the alignment films 7 and 8 (S3). By the described process, electrode substrates 13 and 14 are prepared. Then, the resulting electrode substrates 13 and 14 are laminated with spacers having a thickness of about 1.5 μm in-between (S4). In a space formed between the laminated substrates 13 and 14, a ferroelectric liquid crystal material having a negative anisotropy is injected, and is sealed by the sealing agent 10 (S5).

The ferroelectric liquid crystal has the following phase sequence: I phase—(101° C.)—N* phase —(89° C.)—SmA phase—(69° C.)—SmC* phase, wherein I phase is an isotropic phase, N* phase is a chiral nematic phase, SmA phase is a smectic A phase, and SmC* is a chiral Smectic C phase, and respective temperature in brackets show respective phase transition temperatures.

In the next stage, the liquid crystal panel formed by the described processes S1–S5 is heated to or above a temperature at which the ferroelectric liquid crystal material shows the I phase (S6). Thereafter, a slow-cooling process of the liquid crystal is started at a rate of 1° C./min (S7). In the slow-cooling process, a phase transition occurs in the ferroelectric liquid crystal material to the SmA phase through the N* phase. Here, in a temperature range of from a temperature 15° C. above a transition temperature at which a transition in phase occurs from the SmA phase to SmC* phase, to a temperature 10° C. below the transition temperature, i.e., within a temperature range of from 84° C. to 59° C., a slow cooling process is performed at 0.1° C./min under an applied AC electric field having a frequency of 10 Hz and a voltage of 20V. (SB) On the other hand, a slow cooling process is performed at 1° C./min to room temperature after the temperature of the liquid crystal material is cooled off to 59° C. or below, thereby obtaining the liquid crystal having the SmC* phase which shows a homogeneous C2U (C2-Uniform) alignment (S9). By the described processes of S1–S9, a ferroelectric liquid crystal panel can be prepared.

The drive method of the ferroelectric liquid crystal panel prepared by the described process will be explained.

As described, the ferroelectric liquid crystal adopted in the ferroelectric liquid crystal panel in accordance with the present embodiment has a negative dielectric anisotropy. With regard to the ferroelectric liquid crystal having the negative dielectric anisotropy, it is known that the response time to the drive voltage, i.e., the minimal pulse width required for the switching has a minimal value ($\tau - V_{min}$ characteristic).

The drive method utilizing this characteristics has been proposed, for example, by J. C. Jones, M. J. Towler and E. P. Raynes (see Ferroelectrics 121(1991)91), wherein under an applied AC bias electric field in the non-selected state to the ferroelectric liquid crystal having the negative dielectric anisotropy, the fluctuation in molecule can be suppressed and the memory angle is expanded (AC stabilization effect), thereby achieving a bright and high contrast liquid crystal panel.

For the described drive method, either a C1U alignment or a C2U alignment can be adopted. The C2U alignment is inferior to the C1U alignment in that a larger fluctuation in molecule is observed, and a memory angle is smaller, yet has superior characteristics of wide drive temperature around the room temperature and short response time. In the described drive method, a method of adopting the C2U alignment is hereinafter referred to as $\tau - V_{min}$ mode.

In the $\tau - V_{min}$ mode, in a matrix electrode system, a pulse voltage ($\pm V_s$) is applied to the scanning electrodes in order, while applying the bias voltage ($\pm V_d$) of a waveform according to the display to the signal electrodes. When switching a display, subsequent to the prepulse, a writing pulse of the same polarity as the prepulse is applied. On the other hand, when the display is not switching, a writing pulse having an opposite polarity to the prepulse is applied, which is higher voltage than the rewriting voltage. The described $\tau - V_{min}$ mode has beneficial characteristics of short response time and a wide operable temperature range. The $\tau - V_{min}$ mode also offers a high contrast display achieved by the AC field stabilization effect.

Figure 3:
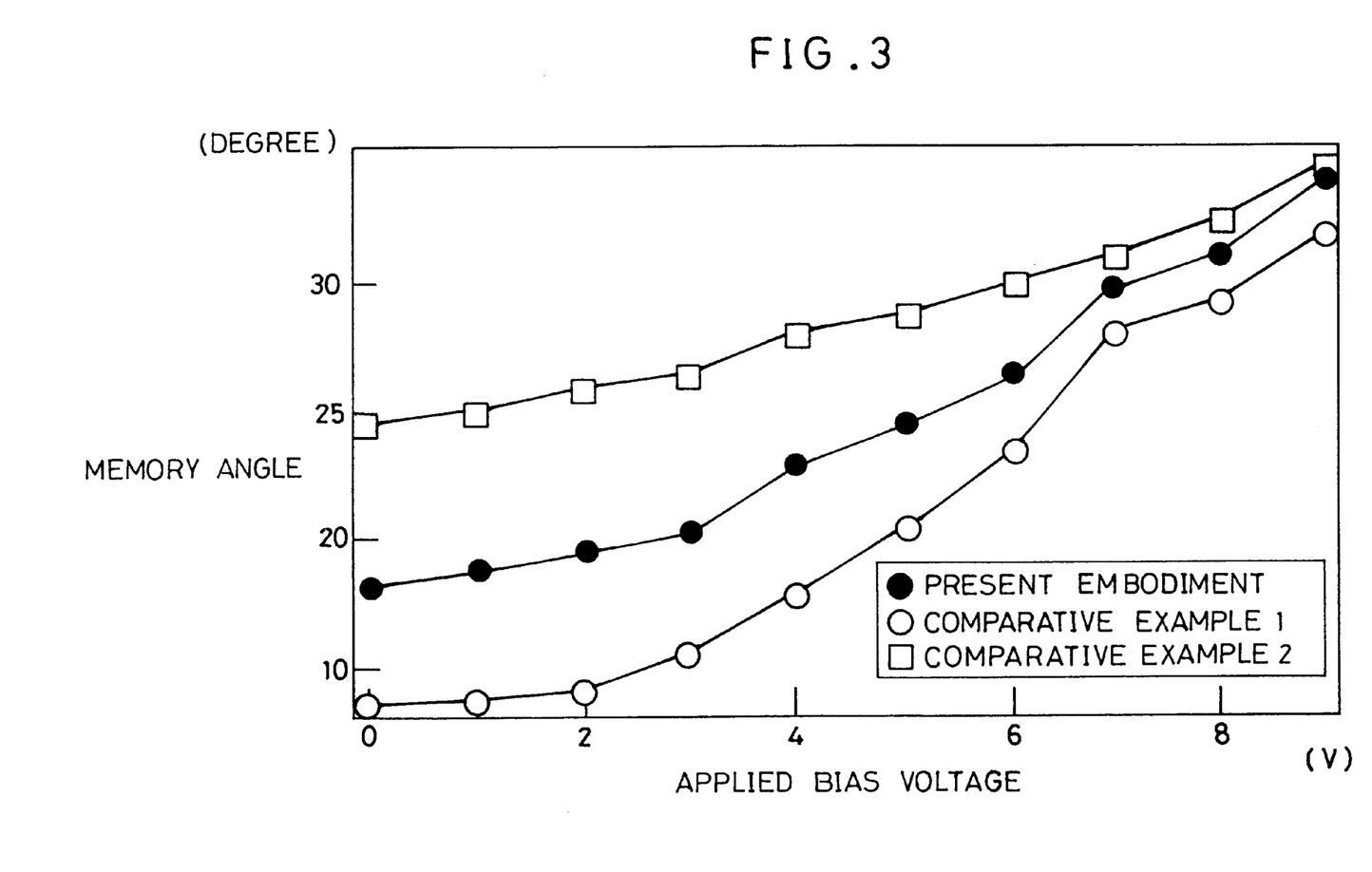
FIG. 3 is a graph showing the memory angles with respect to the applied bias voltage in the liquid crystal panel of the present embodiment and two comparative examples.

FIG. 3 is a graph showing an AC field stabilization effect of the ferroelectric liquid crystal panel in accordance with the present embodiment, i.e., a value of the memory angle obtained from the measurement with respect to the applied bias voltage. In the measurement, a frequency of the applied bias voltage is selected to be 100 KHz. For comparison, the same measurements are performed with respect to the undermentioned comparative examples 1 and 2. The results of measurements of the comparative examples 1 and 2 are also shown in FIG. 3.

Figure 4:
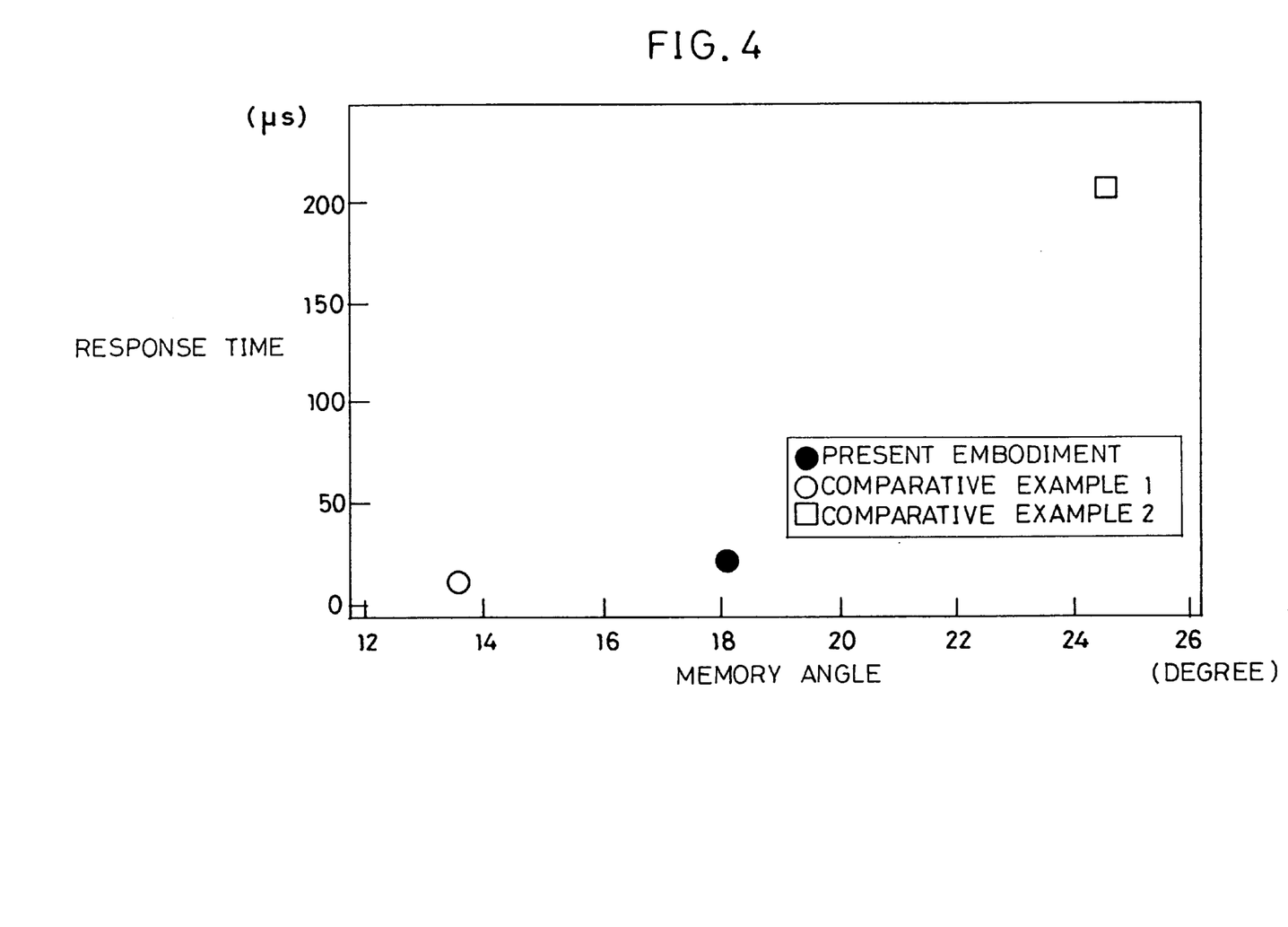
FIG. 4 is a graph showing a correlation between the memory angle and the minimum response time in the liquid crystal panel of the present embodiment and two comparative examples.

FIG. 4 is a graph showing a correlation between memory angle and minimal response time without an applied bias voltage, with respect to the liquid crystal panel of the present embodiment and liquid crystal panels prepared using the methods of comparative examples 1 and 2.

[COMPARATIVE EXAMPLE 1]

The liquid crystal panel prepared by the described processes S1–S5 is heated to or above a temperature at which the I-phase appears in the ferroelectric liquid crystal material. Then, the liquid crystal panel is cooled slowly to the room temperature at 1° C./min. Namely, the above-mentioned electric field treatment is not applied to the liquid crystal panel of comparative example 1.

[COMPARATIVE EXAMPLE 2]

The liquid crystal panel prepared by the described processes S1–S5 is heated to or above a temperature at which the I-phase appears in the ferroelectric liquid crystal material. Then, the liquid crystal panel is cooled slowly to the room temperature at 1° C./min. Thereafter, an AC electric field having a frequency of 10 Hz and a voltage of 20 V is applied in the SmC* phase at room temperature.

First, the liquid crystal panel of the present embodiment is compared with the liquid crystal panel of comparative example 1 prepared without an applied electric field treatment. As is clear from FIG. 3, the memory angle of the liquid crystal panel of the present embodiment is larger by 5 degree than that of the comparative example 1. Additionally, as is clear from FIG. 4, the response time of the liquid crystal panel of the present embodiment is substantially the same as that of the comparative example 1. This shows that an increased memory angle can be achieved without increasing the response time. Furthermore, in the liquid crystal panel of the present embodiment, a uniform C2U alignment is observed, which shows that an enhanced contrast is achieved as compared to the liquid crystal panel of comparative example 1.

Next, the liquid crystal panel of the present embodiment is compared with the liquid crystal panel of comparative example 2 to which an electric field treatment: is applied in the SmC* phase. As is clear from FIG. 3, the liquid crystal panel of comparative example 2 shows a still larger memory angle than the liquid crystal panel of the present embodiment. However, as can be seen from FIG. 4, the liquid crystal panel of comparative example 2 shows significantly longer response time. Besides, when actually displaying an image on the liquid crystal panel of the comparative example 2, an area, in which switch defects and many line defects are generated, is observed. Thus, it is difficult to apply the liquid crystal panel of comparative example 2 in practical applications.

Namely, as is clear when comparing it with comparative liquid crystal panels 1 and 2, the liquid crystal panel prepared according to the method of the present embodiment shows a uniform C2U alignment having beneficial characteristics suited for use in a display apparatus such as short response time, a large memory angle and a high contrast.

As Described, the liquid crystal panel of the present embodiment is prepared by the manufacturing method including the slow cooling process to be performed under an applied AC electric field of low frequency and high voltage, whereby an electroclinic effect appears in a vicinity of a transition temperature at which a transition in phase occurs from SmA phase to SmC* phase. As this permits a phase transition to occur in a liquid crystal molecule while performing a switching about a normal line of the layer, an amount of reduction in an interval between layers when a transition in phase occurs can be reduced. As a result, the tilt angle of the layer having the chevron structure can be reduced, and the structure of the liquid crystal layer in SmC* phase can be approximated to a desirable bookshelf structure, and a still more uniform alignment can be achieved, thereby providing a bright and high contrast liquid crystal panel.

In S8, the cooling rate under an applied AC electric field is selected to be lower (0.1° C./min) as compared to 1° C./min in S7 and S9. However, the cooling rate in S8 may be selected to the same cooling rate as that in S7 or S9. However, it is preferable that a longer time be required for applying the electric field by reducing the cooling rate when carrying out the electric field treatment in a prescribed temperature range as in S8, because it is confirmed that such condition would offer more noticeable effects of reducing the tilt angle of the liquid crystal layer.

With regard to the AC electric field to be applied in S8, it is preferable that the frequency be in a range of from 1 Hz to 10 KHz, and that the amplitude of the electric field be in a range of from 0.5 V/$\mu$m. to 30 V/$\mu$m. Namely, by applying the AC electric field which satisfies the described condition in the temperature range between a temperature 20° C. above a transition temperature at which a transition in phase occurs from SmA phase to a SmC* phase and a temperature 20° C. below the transition temperature, a tilt angle of the layer having the chevron structure can be reduced, thereby achieving an alignment having a uniform texture without defects.

While the preferred form of the present invention has been described, it is to be understood that modifications will be apparent to those skilled in the art without departing from the spirit of the invention. For example, examples of adopting the ferroelectric liquid crystal as a liquid crystal material have been explained. However, the present invention is not limited to the described preferred embodiment, and the described electric field treatment can be applied to any ferroelectric or antiferroelectric liquid crystal wherein a phase transition from the SmA phase to the SmC* phase is observed having electroclinic effect, which offer the same effect. The described phase sequence and phase transition temperature of each phase of the described ferroelectric liquid crystal show only one preferred example, and other liquid crystal materials which show various phase series and phase transition temperatures may be adopted.

It is also known that the SmC* phase includes sub-phases such as SmC$_A$*, SmC$_\alpha$*, SmC$_\beta$*, SmC$_\gamma$*, etc. However, the same effect can be achieved while applying the electric field process irrespectively of the kind of such sub-phase.

As shown in FIG. 2, the arrangement adopting the glass substrate has been described in the preferred embodiment. However, the suitable material for the substrate is not limited to glass, and any material having excellent properties in light-transmitivity and insulating property can be equally adopted.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the instant contribution to the art and, therefore, such adaptations should and are intended to be comprehended within the meaning and range of equivalence of the appended claims.

What is claimed is:

1. A method of manufacturing a liquid crystal display element including a liquid crystal material sealed between a pair of substrates, wherein a phase-transition to a chiral smectic C phase in a C2U alignment in the liquid crystal material is permitted by heating and subsequently slow cooling the liquid crystal material, wherein:

the liquid crystal material is one member selected from the group consisting of a ferroelectric liquid crystal material and an antiferroelectric liquid crystal material, and in a phase-transition from a smectic A phase to the chiral smectic C phase, the liquid crystal material is cooled slowly with an application of an AC electric field which generates an electroclinic effect.

2. The method of manufacturing the liquid crystal display element as defined in claim 1, wherein:

$T_c \leq T_B \leq T_c+20$, and $T_c-20 \leq T_E \leq T_c$ are satisfied, wherein $T_B$ is a temperature of the liquid crystal material when the application of the AC electric field is started, $T_E$ is a temperature of the liquid crystal material when the application of the AC electric field is completed, and $T_c$ ° C. is a phase transition temperature of the liquid crystal material from the smectic A phase to the chiral smectic C phase, the AC electric field has a frequency in a range of from 1 Hz to 10K Hz and an amplitude in a range of from 0.5 V/$\mu$m to 30 V/$\mu$m.

3. The method of manufacturing the liquid crystal display element as defined in claim 1, wherein:

said liquid crystal material includes a ferroelectric liquid crystal having a negative dielectric anisotropy.

4. The method of manufacturing the liquid crystal display element as defined in claim 1, wherein:

a rate of the slow-cooling process with the application of the AC electric field is lower than a rate of the slow-cooling process without the application of the AC electric field.

5. The liquid crystal display element manufactured by the manufacturing method as defined in claim 1.

6. The liquid crystal display element manufactured by the manufacturing method as defined in claim 2.

7. The liquid crystal display element manufactured by the manufacturing method as defined in claim 4.

8. A liquid crystal display element, comprising:

a pair of substrates; and a liquid crystal sealed between said pair of substrates, said liquid crystal being one member selected from the group consisting of a ferroelectric liquid crystal and an antiferroelectric liquid crystal which show a chiral smectic c phase, said liquid crystal having a phase series in which a smectic A phase is shown at a higher temperature side than the chiral smectic C phase, wherein said liquid crystal is cooled slowly under an applied AC electric field which generates an electroclinic effect when a transition in phase occurs from the smectic A phase to the chiral smectic C phase, whereby said liquid crystal generates a C2U alignment.

9. The liquid crystal display element as set forth in claim 8 characterized in that:

said liquid crystal material includes a ferroelectric liquid crystal having a negative dielectric anisotropy.

10. The liquid crystal display device, comprising:

a drive circuit; and said liquid crystal display element as defined in claim 8.

11. The liquid crystal display device, comprising:

a drive circuit; and said liquid crystal display element as defined in claim 9.

* * * * *